Sept. 16, 1924. 1,508,825
G. D. SUNDSTRAND
SKIP FEED MILLING MACHINE
Filed Feb. 16, 1920     5 Sheets-Sheet 1
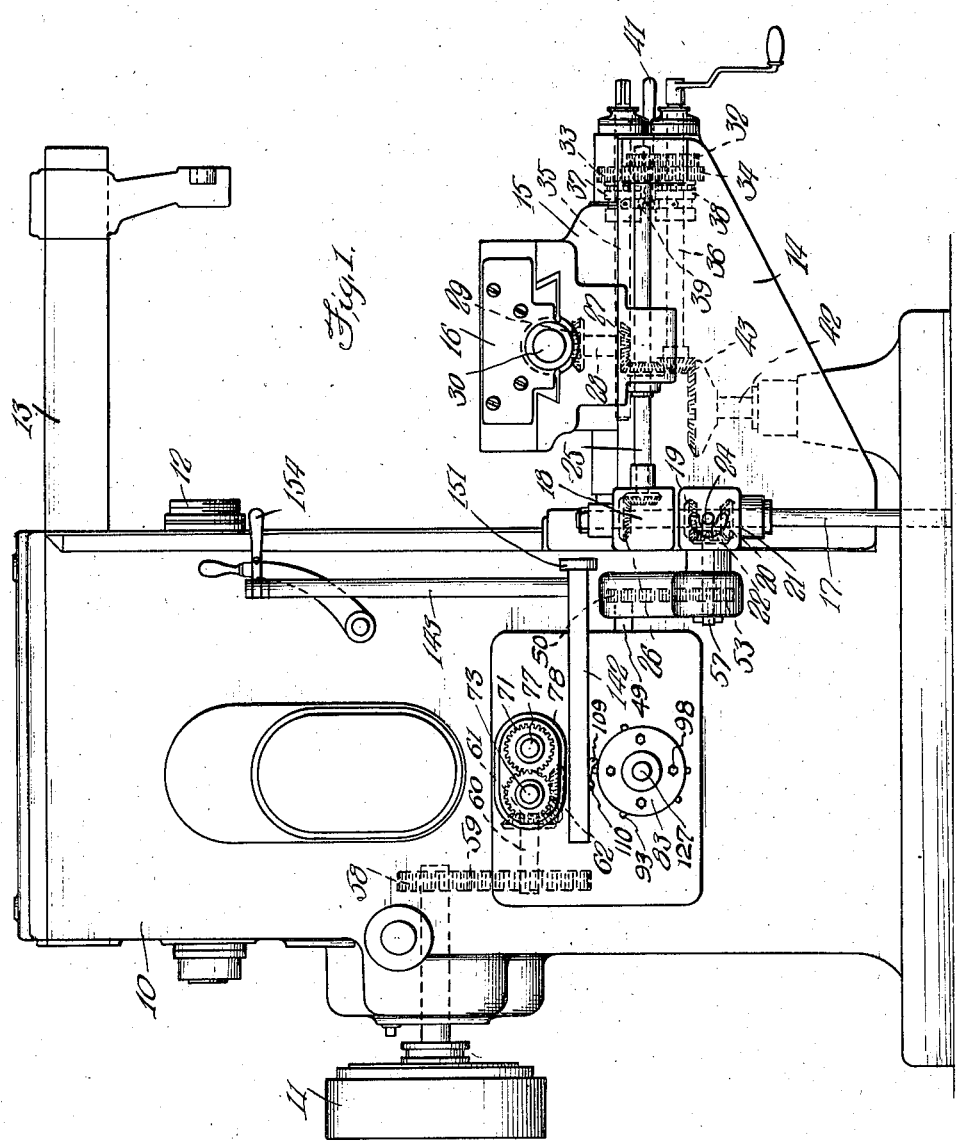
INVENTOR.
Gustaf D. Sundstrand.
By Miller Chindohl & Parker
ATTORNEYS.

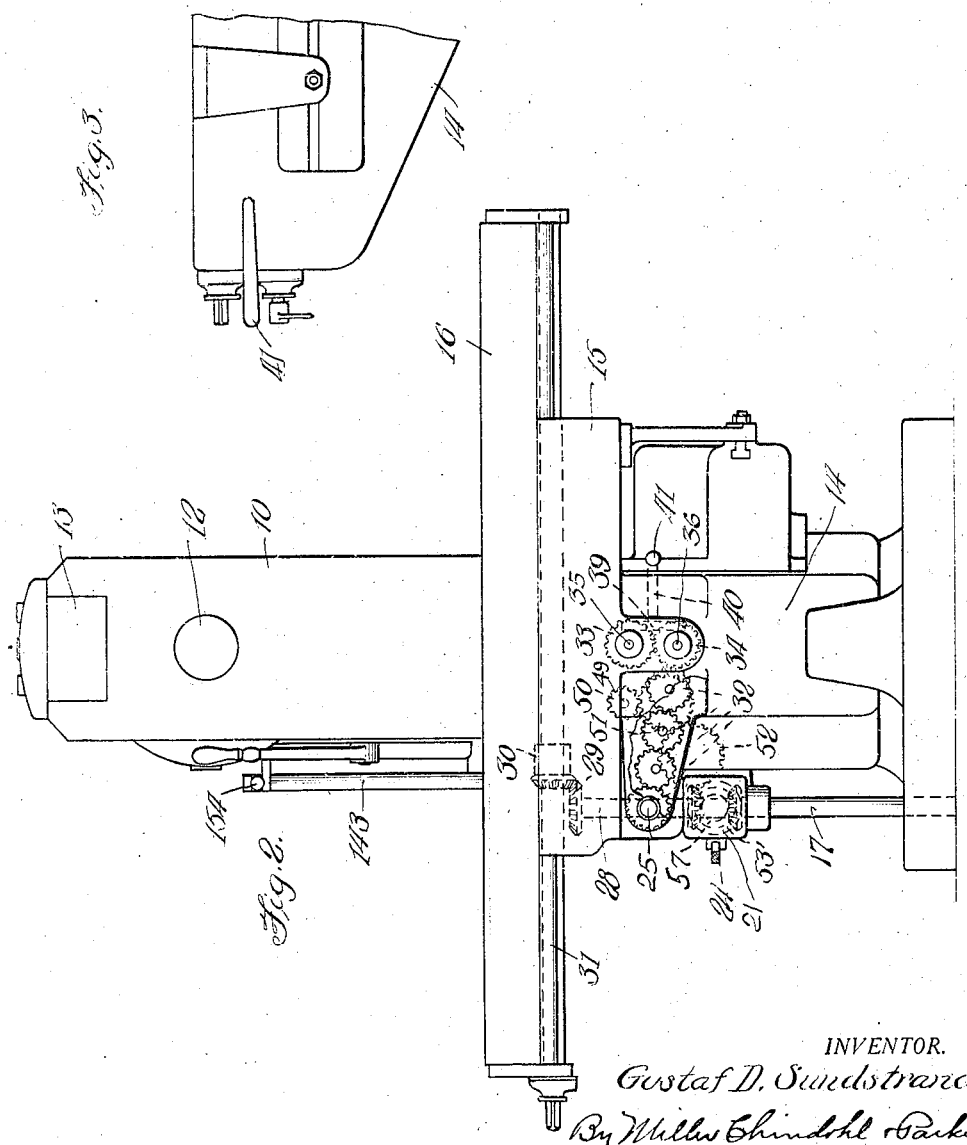

Sept. 16, 1924.  
G. D. SUNDSTRAND  
SKIP FEED MILLING MACHINE  
Filed Feb. 16, 1920   5 Sheets-Sheet 3
1,508,825
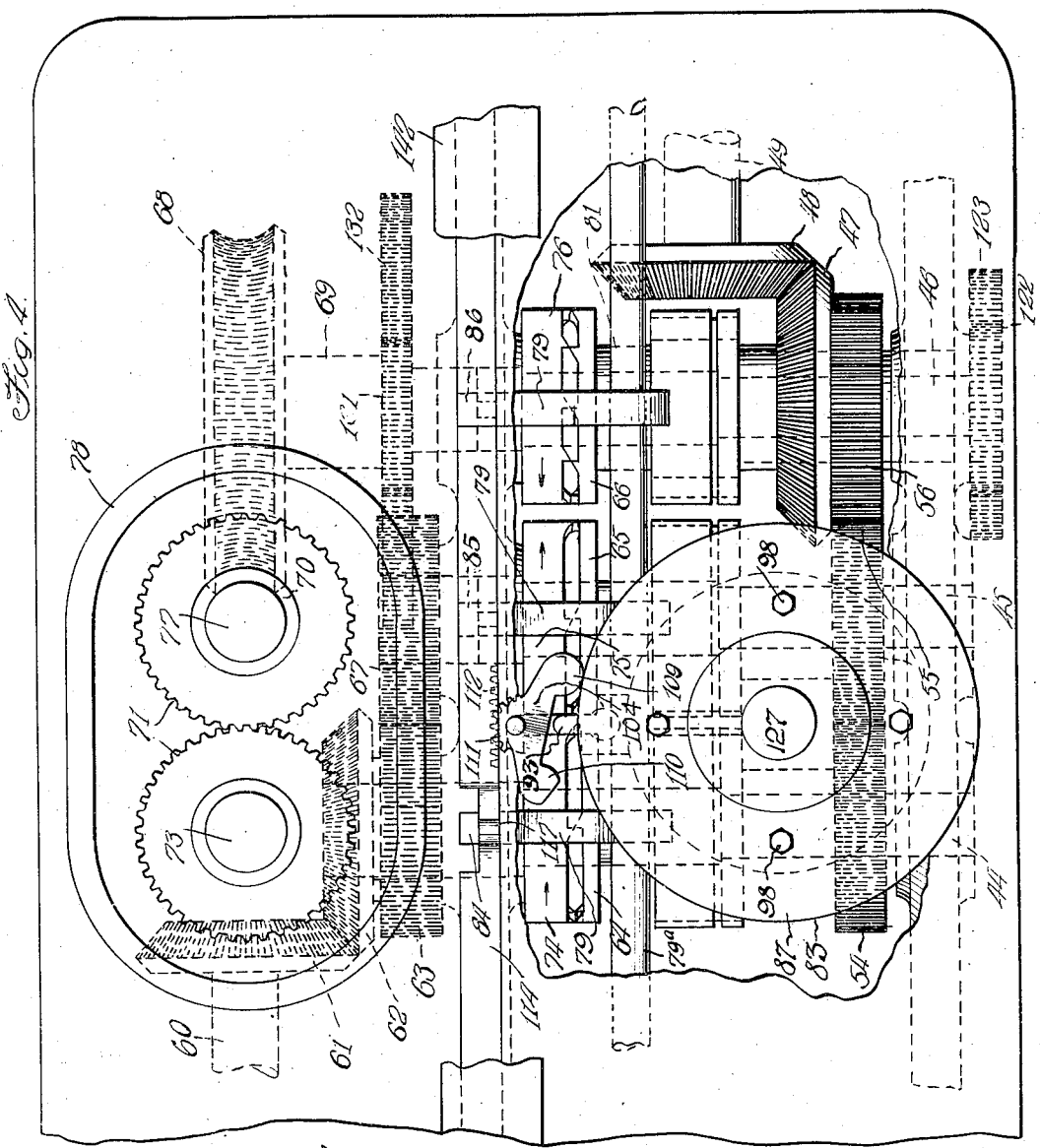
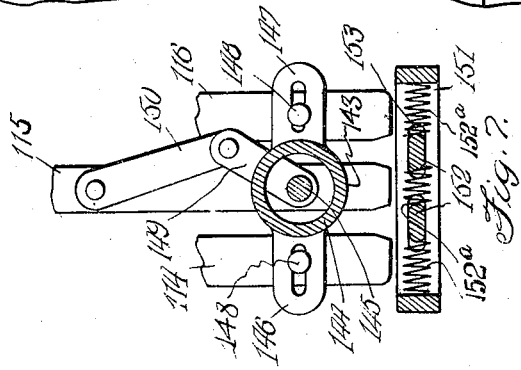
INVENTOR.  
Gustaf D. Sundstrand  
By Miller Chindohl Parker  
ATTORNEYS.

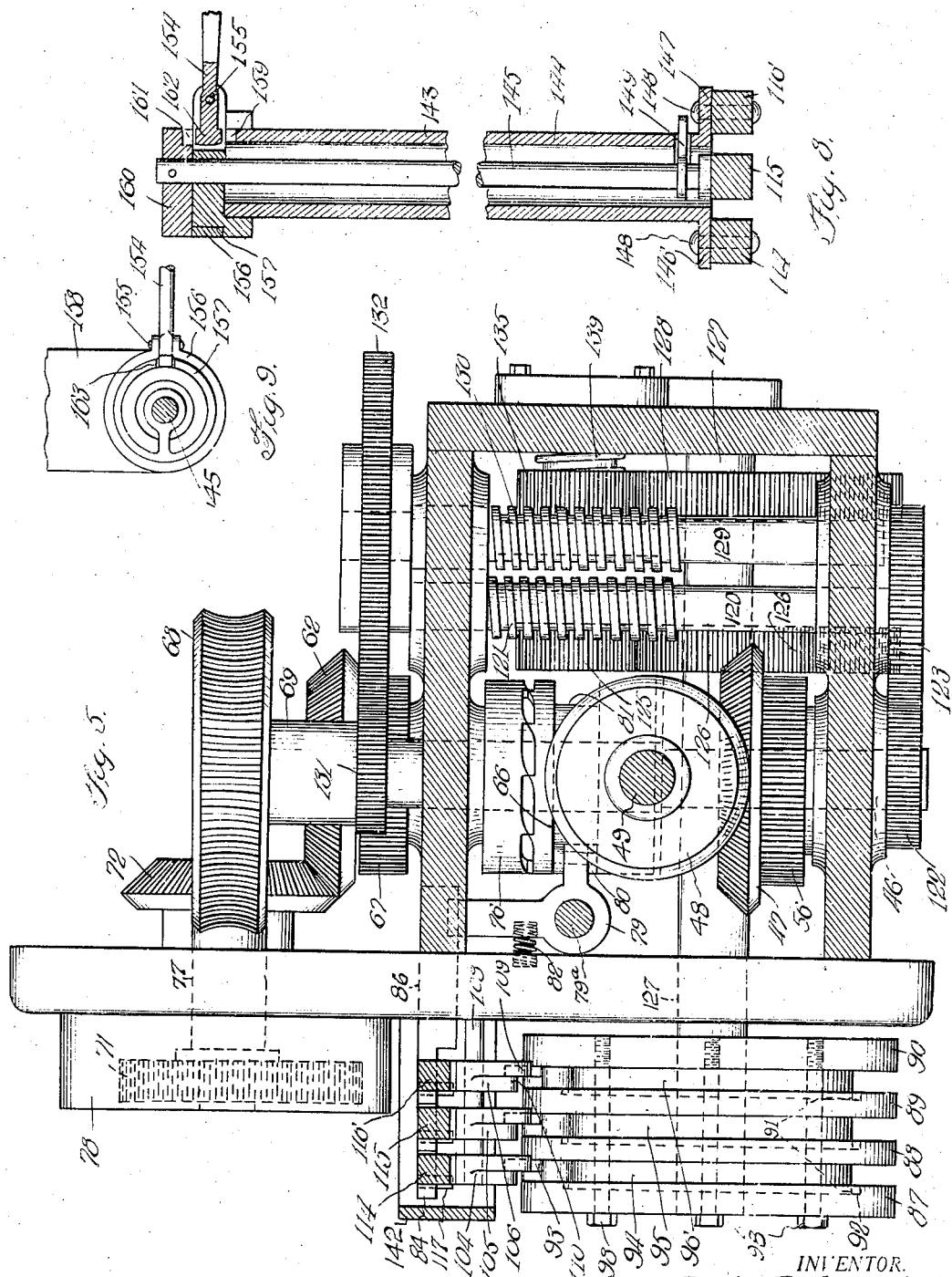

Sept. 16, 1924.
G. D. SUNDSTRAND
1,508,825
SKIP FEED MILLING MACHINE
Filed Feb. 16, 1920     5 Sheets-Sheet 5
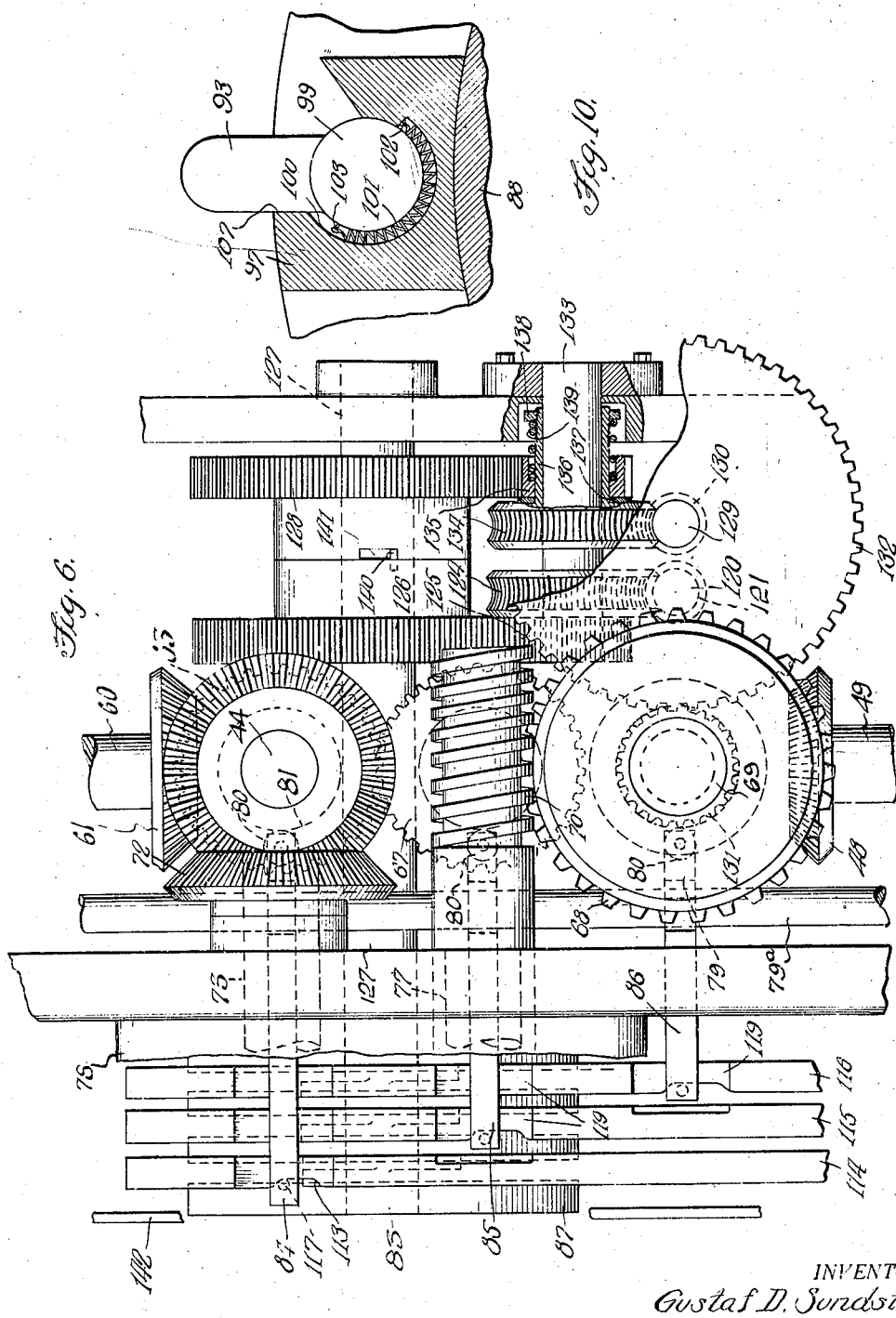
INVENTOR.
Gustaf D. Sundstrand
By Miller Chindohl Parker
ATTORNEYS.

Patented Sept. 16, 1924.

1,508,825

UNITED STATES PATENT OFFICE.

GUSTAF DAVID SUNDSTRAND, OF ROCKFORD, ILLINOIS, ASSIGNOR TO ROCKFORD MILLING MACHINE COMPANY, OF ROCKFORD, ILLINOIS, A CORPORATION OF ILLINOIS.

SKIP-FEED MILLING MACHINE.

Application filed February 16, 1920. Serial No. 359,031.

*To all whom it may concern:*

Be it known that I, GUSTAF DAVID SUNDSTRAND, a citizen of the United States, residing at Rockford, in the county of Winnebago and State of Illinois, have invented certain new and useful Improvements in Skip-Feed Milling Machines, of which the following is a specification.

My invention relates to milling machines and more specifically to a milling machine embodying automatic means for moving the work carrying table at different speeds during different portions of its travel. The work to be done on milling machines is frequently such that the tool must finish a surface and the work must then be moved a considerable distance to bring another surface into position, which is then finished by the same tool without any readjustment of the tool or work. These surfaces may be different portions of the same piece of stock, or corresponding portions of different pieces of stock, or both. To allow the table to move the intermediate distance at the slow rate necessary while cutting is taking place is a waste of time, and to manually change the rate of motion requires the constant attention of the operator. It is desirable, therefore, in machining large numbers of similar parts to provide automatic mechanism which can be set to move the table slowly during the portions of its travel in which machining takes place, and rapidly during intermediate portions of its motion. It is also advantageous to automatically return the table to the starting point and leave it there at rest until the operator changes the stock and starts the machine again.

A primary object of my invention is to provide relatively simple and efficient means for performing each of the above mentioned functions.

Another object of my invention is to locate the automatic control means in a convenient position out of the way of the operator and removed from dust and dirt, and especially from the metal chips produced by the machine.

A special object of my invention is to provide an automatically controlled transmission for performing the functions above outlined which may be substituted for the feed box of an ordinary milling machine making it possible to use machines already in service in connection with my improved device, and also economizing by using standard parts for the spindle transmission and the transmission to the table in manufacturing new machines.

Another object of my invention is to eliminate the spring actuated lost-motion connections heretofore employed for reversing or changing the speed of the table automatically. The devices of the prior art have employed dogs or equivalent elements carried by or moved in synchronism with the table and adapted to make contact with and actuate clutch shifting mechanism. In operating the clutch shifting mechanism to throw out one clutch and throw in another, the first movement of throwing out a clutch will arrest the motion of the table. It has been customary to provide a lost-motion connection between the dog and the clutch in combination with resilient means tensioned by the initial movement of the clutch actuating means before stoppage of the table, and adapted to complete the motion of the clutch shifting mechanism and start the table again. Resilient devices of this sort are so abrupt and spasmodic in their action as to impose severe strains on the transmission of the entire machine and when the clutch teeth are slightly worn they are apt to fail to operate entirely, the teeth chattering past each other, interrupting the operation of the machine, causing objectionable noise, and further wearing away the clutch teeth.

It is an object of my invention to remedy this defect. I may accomplish this by providing for continued motion of either the table or some intermediate element of the transmission between the table and the clutches, after the power feed has been disconnected from the table, so that the next clutch may be actuated by a slow and relatively positive motion into engagement to start the table on the next step in the cycle of operations.

Further objects and advantages of my invention will become apparent as the description proceeds.

Referring to the accompanying drawings, Figure 1 is a side view and Fig. 2 a front elevation of a milling machine, illustrating the application of my invention thereto.

Fig. 3 is a detail view of one side of the knee. Fig. 4 is a side elevation of my improved automatic control mechanism a portion of the wall of the casing therefor being broken away to disclose the parts therebehind. Fig. 5 is a front elevation, and Fig. 6 is a plan view of the parts illustrated in Fig. 4. Figs. 7, 8 and 9 are detail views of the manual control connections, and Fig. 10 is a detail view of a dog and its support.

The embodiment of my invention disclosed comprises a source of power, or power driven element; a table or element to be driven; a transmission from said source of power to a plurality of variously driven clutch elements; and transmission means from a plurality of co-operating clutch elements to the table. An automatic control element is employed to selectively engage the cooperating clutch elements, and is driven by two transmissions, the first being a lost-motion transmission from the table which may come through the power transmission to any convenient intermediate point between the co-operating clutch elements and the table; and the second being an impositive transmission from the source of power which may also come through the power transmission for the power driven clutch elements to any convenient intermediate point. Additional advantages of the particular construction disclosed are the use of clutches normally held out of engagement both by gravity and the resilient action of a spring, and a relatively positive means of moving the clutches into engagement by transmissions in which locking mechanism is interpolated.

I have illustrated my invention in connection with an ordinary milling machine comprising a column 10 carrying a power element illustrated as a pulley 11, a spindle 12, an overarm 13, and a vertically slidable knee 14. Any suitable or preferred transmission (not shown) from the power receiving element 11 to the spindle 12 may be employed. The knee 14 carries a horizontally slidable saddle 15 movable in a line parallel to the spindle, and the saddle carries a transversely slidable table 16 in the customary way.

Any suitable or preferred connections for transmitting power to the table from the control mechanisms carried by the column 10 may be employed. I have illustrated a vertical shaft 17 supported in a casing 18 carried by the knee 14 and passing through bevel gears 19 and 20 in a casing 21 carried by the column 10. The bevel gears 19 and 20 are driven by the bevel gear 22 and may be selectively connected to the shaft 17 by the usual splined clutch element operated by the control lever 24. In the position illustrated, the lever 24 is in neutral position and shaft 17 is not actuated. The horizontal shaft 25 receives motion from the shaft 17 by suitable bevel gears 26 and extends outwardly beside the knee 14. Motion is transmitted to the table from the shaft 25 by means of bevel gears 27, vertical shaft 28 and bevel gears 29 driving a rotatable element 30. This element 30 may, as illustrated, be a sleeve splined to the feed screw 31 to rotate it in a fixed nut (not shown), or it may be a rotatable nut having threads engaging a stationary feed screw.

Any suitable means may be provided for raising and lowering the knee and for moving the saddle toward and away from the column by the power delivered to shaft 25. I have illustrated a train of gears 32 transmitting the rotation of the shaft 25 to gears 33 and 34 rotatably mounted on the saddle feed screw 35 and the feed shaft 36 for the knee respectively. Clutches 37 and 38 may be alternately moved into engagement with their respective gears by a suitable lever 39 having fingers to engage the clutches. The lever 39 is pivotally mounted on the shaft 40 and may be rocked in either direction by a suitable hand lever 41 on the side of the knee 14. The feed shaft 36 for the knee 14 operates to raise and lower the knee by rotating the vertical feed screw 42 through bevel gears 43.

The above described mechanisms in and of themselves are all old and well known in the art although I believe myself to be the first to combine all of them without change as illustrated with automatic means for controlling the table feed. They also cooperate with my improved automatic control means to produce a novel and beneficial result, as will hereinafter be explained.

The automatic control means I have provided for determining the speed of the shaft 17 is best illustrated in Figs. 4, 5 and 6 and comprises in this instance, three vertical parallel shafts 44, 45 and 46 (Fig. 4) geared together by a continuous train of three gears 54, 55 and 56. A bevel gear 47 on the shaft 46 is at all times in mesh with the bevel gear 48 on the horizontal shaft 49 which through suitable intermediate gears 50, 51, 52 and 53 (Figs 1 and 2) and the shaft 57 drives the bevel gear 22 to deliver power to the shaft 17. The vertical shafts 44, 45 and 46 carry splined clutch elements 64, 65 and 66, respectively.

Power driven clutch elements 74, 75 and 76 overlie the splined clutch elements 64, 65 and 66, respectively, and are arranged to be driven in different directions and at different speeds to provide different rates of motion for the transmission to the shaft 17 and thence to the table. I have illustrated means for thus driving the power driven clutch elements 74, 75 and 76 from the power receiving element 11, comprising gears 58 and 59 (Fig. 1), a shaft 60 and a bevel gear 61 meshing with a bevel gear 62 on a vertical shaft carrying the clutch element 74. The middle clutch element 75 is driven through gears 63 and 67 which in this instance are arranged to rotate it in the opposite direction at approximately the same rate of speed as the clutch element 74.

The clutch element 76 is driven at a relatively low speed for feeding purposes. Connections for this comprise a worm wheel 68 on the shaft 69 carrying the clutch element 76 and receiving motion from the worm 70 (Fig. 6) driven through change gears 71 from a bevel gear 72 meshing with the bevel gear 62. The change gears 71 are mounted on the outer ends of the parallel shafts 73 and 77 carrying the bevel gear 72 and worm 70 respectively, and lie within a casing 78 which may be equipped with a removable cover (not shown). The change gears 71 may be readily removed and interchanged or replaced to provide any desired rate of motion for the low speed or feeding movement of the table.

Power to feed the table slowly is transmitted as follows: shaft 60, beveled gears 61, 62 and 72, shaft 73, change gears 71, shaft 77, worm 70, worm wheel 68, shaft 69, clutch 76—66, shaft 46, beveled gears 47 and 48 and shaft 49.

Power to feed the table rapidly is transmitted from shaft 60, beveled gears 61 and 62, pinions 63 and 67, clutch 75—65, shaft 45, gear wheels 55 and 56, shaft 46, beveled gears 47 and 48 to shaft 49.

Power to return the table rapidly to starting position is derived from shaft 60, beveled gears 61 and 62, clutch 74—64, shaft 44, gears 54, 55 and 56, shaft 46, beveled gears 47 and 48 and shaft 49.

The means for automatically shifting the clutch elements 64, 65 and 66 which control the motion of the table will now be described. Pivoted preferably upon a common shaft 79ª are three bell crank levers 79 which are associated with each of these clutch elements and at their upper ends are socketed in transverse slides or control rods 84, 85 and 86 (Fig. 6). A roller 80 may be carried by each lever 79 to engage the peripheral groove 81 in the splined clutch element. Resilient means which I have illustrated as a short compression spring 82 (Fig. 5) is associated with each of the transverse slides 84, 85 and 86 tending normally to hold the clutch elements out of engagement. In the arrangement shown the weight of the lower clutch element assists the action of the spring.

A drum 83 (Fig. 1) comprising four disks 87, 88, 89 and 90 (Fig. 5), three of which have bosses 91 entering depressions 92 in the adjacent disks, is adapted to carry a plurality of dogs 93 (Fig. 10) peripherally spaced in each of the three grooves 94, 95 and 96 formed between the disks. Each dog 93 (see Fig. 10) is mounted in a block 97 adapted to rest in any one of the grooves 94, 95 and 96. The disks may be drawn toward each other by suitable clamping bolts 98 passing freely through the disks 87, 88 and 89 and threaded into disk 90. Any desired number of blocks 97 may be suitably spaced in each of the slots and the automatic action of the table will be determined by this spacing.

Referring to Fig. 10, it will be seen that each dog is pivotally mounted in its block by the engagement of its cylindrical base 99 in a socket in the block. A small groove 100 cut in the block 97 runs around a portion of the periphery of the socket and contains a small tension spring 101 suitably attached at 102 and 103 to the block 97 and the base 99 respectively. It will be apparent that as the parts illustrated in Fig. 10 move to the right, the dog will engage any object imposed in its path, being positively prevented from yielding by abutment against the shoulder 107 of the block 97. On motion in the opposite direction, however, the spring 101 will allow the dog to yield by rotation and pass under any obstacle imposed in its path.

Rocker elements 104, 105 and 106 (Fig. 5) are pivotally supported on a suitable pintle 108 over the slots 94, 95 and 96 respectively and are adapted to be engaged and actuated by the dogs 93. As best illustrated in Figs. 4 and 5, each of the rockers comprises an arm 109 overlying approximately one-half of its groove and an oppositely extending arm 110 overlying the other half. The dogs 93 are of two kinds, those illustrated in Fig. 5 being each adapted to shift its rocker in one direction which as illustrated happens to be the direction to engage the corresponding clutch element. A similar dog having its outwardly projecting portion underlying the other arm 110 of its rocker is employed to release a clutch. The rockers 104, 105 and 106 carry gear teeth 11 meshing with rack portions 112 on longitudinal slides 114, 115 and 116. The slide 114 is notched at 113 and the transverse slide 84 carries a downwardly projecting pin 117 adapted to rest against the side of the longitudinal slide 114 in the notch 113. Longitudinal movement of the slide 114 will move the notch 113 away from the pin which will engage the sloping sides of the notch and be forced out to ride against the uncut portion of the side of the slide 114. The transverse motion thus imparted to the transverse slide 84 will operate the corresponding bell crank lever 79 to engage the splined clutch element 64. In this position slide 84 is locked in place and cannot be moved until slide 114 is returned to initial position.

Slide 116 where it passes under slides 85 and 86, and slides 114 and 115 where they pass under slides 85 and 84 have their upper faces notched, or cut down, as at 119, (Fig. 6) to allow them to move through the required distance, without interference. Slides 115 and 114 are also cut away on one side opposite the ends of slides 86 and 85 for the same purpose.

After the continued rotation of the drum 83 has automatically disconnected whichever one of the clutches 64, 65 or 66 was in engagement, and thereby has disconnected the table from the source of power it is necessary that the table or some portion of the transmission between the same and the clutch elements 64, 65 and 66 continue its motion far enough to cause engagement of another clutch. I have provided for this additional motion by means of a lost motion connection in the power transmission between the table 16 and the drum 83 as just below described. Another reason for providing this form of connection as above referred to is to make the movement of the clutches slow and relatively positive as distinguished from the ordinary spring-actuated lost motion connections heretofore employed.

A vertical shaft 120 (Fig. 5) carrying a worm 121 is driven through gears 122 and 123 from the vertical shaft 46 which is continually engaged with the transmission to the table through the bevel gears 47 and 48 (Figs. 4 and 5). This shaft will therefore rotate when the table moves and reverse its direction of motion when the table is reversed. A worm wheel 124 (Fig. 6) carrying a pinion 125 integral with or fixed to it, is driven by the worm 121; and the pinion 125 meshes with a gear 126 rotatable on the shaft 127 carrying the drum 83. A similar gear 128 (Fig. 6) is constantly urged in one direction only, regardless of the motion of the table. The connections for this comprise a shaft 129 carrying a worm 130 and driven through gears 131 and 132 from the upper vertical shaft 69. This shaft is constantly driven in an unvarying direction through the change gears 71 and the worm 70 and worm wheel 68 independently of the motion of the table. The worm wheel 134 that meshes with the worm 129 is rotatable on the same supporting shaft 133 as the worm wheel 124. A pinion 135 rotatably mounted on the sleeve 136 carried by worm wheel 134 meshes with the gear 128 and is frictionally urged to rotate with the worm wheel 134 by means of a friction washer 137 interposed between them.

Any suitable means for maintaining a proper pressure on the friction washer 137 may be provided.

I have illustrated a nut 138 threaded on the sleeve 136 and a compression spring 139 placed under compression between the pinion 135 and nut 138. The pinion may be grooved to provide a seat for the spring as shown.

The gear 128 is keyed to the shaft, thereby constraining the drum 83 to rotate in exact accordance with the motion imparted to it. A lost motion connection between the gears 126 and 128 has been provided in the nature of a pin 140 carried by one of the gears 126 and entering a peripheral notch 141 cut in the sleeve carrying the other gear 128. The speed ratio of the transmission to the frictionally driven gear 128 is such that it tends to rotate at a slightly lower speed than the positively driven gear 126 when the table is being fed. During the feeding operation therefore, the positively driven gear 126 will move faster than the gear 128 until the pin 140 as illustrated in Fig. 6, comes to the end of the notch 141 after which the frictionally driven gear 128 will be constrained to rotate in unison with the positively driven gear 126 carrying the drum with it and forcing the pinion 135 to slip on friction washer 137. As soon as the clutch, which in this instance is clutch 66, is disengaged, the motion of the table and of the positively driven gear 126 will cease. The transmission to the frictionally driven gear 128, however, will continue to operate and rotate the shaft 127 and drum 83 through a distance corresponding to the play allowed by the notch 141 which will be adequate to bring another dog, carried for instance in the slot 95, under the rocker 105 thus engaging clutch 65 and imparting a rapid or traverse movement to the table. When this occurs the positively driven gear 126 will immediately overtake the frictionally driven gear and carry it along forcing the frictional connection to slip.

At the end of the traverse the disconnection of clutch 65 will again arrest the table and the frictionally driven gear will as before continue the motion of the drum far enough to throw in another clutch, for instance, the feed clutch 66, to start the table again at a low speed. At the end of the stroke of the table, the feed or traverse clutch as the case may be, will be automatically disengaged and the continued motion of the drum 83 will throw in the return clutch 64. The table will thereupon be returned rapidly to its original position where a dog in slot 94 will engage rocker 104 to disconnect the return clutch, thereby arresting the motion of the table. This last dog must obviously be set to act positively on its rocker 104 when the drum is moving in the return direction.

During the return movement the positively driven gear 126 will force the frictionally driven gear 128 to rotate in the opposite direction from that normally imparted to it by the friction transmission.

When the stoppage of the table arrests the motion of the gear 126, therefore, the frictionally driven gear 128 will be at the extreme limit of the relative motion allowed by the notch 141 and as the friction transmission tends to move it in the opposite direction from that in which it has been forced to move by the positively driven gear 126 it will remain in this position held by the tendency of the transmission to move it in opposition to the last motion of the positively driven gear. The drum, therefore, will stop dead, and no further operation of the machine will occur until it is started again by the operator.

I have illustrated suitable manual control connections for this starting operation and also for complete manual control of the motions of the table when for any reason it is preferable not to employ the automatic control. The longitudinal slides 114, 115 and 116 are enclosed in a casing 142 extending along the side of the column 10 and terminating near the end of a vertical control column 143 comprising a sleeve 144 and a shaft 145 extending inside the sleeve and rotatable therein. The connections between the vertical control column and the longitudinal slides 114, 115 and 116 are clearly illustrated in Figs. 7 and 8 and comprise a pair of ears 146 and 147 extending in opposite directions from the sleeve 144 and having slotted connection with pins 148 carried by the longitudinal slides 114 and 116 respectively. It will be apparent that rotation of the sleeve to advance either slide 114 or 116 to engage its clutch will retract the other slide. It is therefore impossible to damage the machine which might otherwise be caused by simultaneously connecting clutches 64 and 66 to transmit power to the table.

The slide 115 may be controlled by rotation of the shaft 145 which is connected to it by an arm 149 extending through an arcuate slot in the sleeve 144 and a connecting link 150. To absolutely prevent simultaneous operation of the central slide 115 and either of the slides 114 and 116, I have provided automatic stop means in the nature of a small casing 151 (see Fig. 7) adjacent the ends of the slides and carrying two stop blocks 152 transversely slidable in slots 153 and normally urged, as, for example, by spring means 152ª, to the central positions illustrated. Motion of the slide 115 to engage its clutch will thrust the end of the slide between the blocks shoving them laterally into the path of the slides 114 and 116 so that neither of these can possibly be operated. Similarly, the operation of either slide 114 or 116 to engage its clutch will displace one of the blocks 152 into the path of the slide 115.

At the top of the control column I have provided suitable manual control means in the nature of a control lever 154 (Figs. 8 and 9) pivoted on a horizontal pintle 155 carried by a ring 156 encircling a boss 157 on the arm 158 which forms a support projecting from the column 10 to brace the upper end of the control column 143. The sleeve 144 terminates level with the lower surface of the ring 156, having a notch 159 cut in its upper end, and the shaft 145 extends above the plane of the ring 156 carrying a disk 160 having a similar notch 161. The inner end of the control lever 154 forms a head 162 which may be moved up to engage the notch 161 or down to engage the notch 159. After being moved down, it is clear of projections 163 carried by the boss 157 so that the lever and its supporting ring 156 may be rotated to rotate the sleeve 144. After having rotated the sleeve it is impossible to engage and rotate the shaft 145 without returning the sleeve to neutral position, after which the head 162 may be moved up between the projections 163 to enter the notch 161 and subsequent rotation of the lever 154 and ring will rotate the shaft 145. In machines equipped with the casing 151 of Fig. 7, the projections 163 or any equivalent safety means may be omitted.

In using my improved device, the bolts 98 are loosened and any desired number of dogs are inserted in the slots 94, 95 and 96 to provide automatic alternation from feed to traverse and back again and automatic return to the initial position, corresponding to the sizes and shapes of the articles to be machined. The tightening of the bolts will then securely clamp the dogs 93 in place. The periphery of the drum may be suitably graduated into spaces corresponding to inches of motion of the table 16 or into any other convenient unit to facilitate the setting of the dogs. The work may then be placed on the table, moved to initial position and the clutch lever 24 thrown into neutral while the operation of the transmission up to the clutch controlled by said lever may be allowed to carry the drum through its cycle of operations to see that the dogs are properly set. When the drum has reached the proper position, the table may be connected to it by operating the clutch lever 24 and the machine may thereafter be operated by relatively unskilled labor as all that need be done is to remove the castings or work from the table each time the machine stops, replace them with new stock and start the table by operating the hand lever 154.

The ability to register or change the register of the table and work without disturbing the spacing of the dogs on the drum results from the location of the clutch control 24 in its customary position, which makes it possible to disconnect the entire automatic control and allow it to move through part of a cycle without disturbing the position of the table. In the devices of the prior art the automatic clutch shifting elements have ordinarily been mounted on and carried by the table itself and any change of register necessitated readjusting all the dogs used. In my improved device, however, not only may the original set up be facilitated by this means, but in case a partially broken cutter stalls the machine or forces the clamps holding the work on the table to slide, the displacement of the work need not be remedied, as after a new cutter has been provided the clamps can be tightened and the drum shifted slightly with respect to the table to compensate for the shifting of the work. My improved automatic control device is also located entirely out of the way of the workmen and where it will not be interfered with by chips, dirt or the tools frequently laid on or near the table or saddle. It may also be substituted for the box which is customarily carried on the side of a column of many standard makes of milling machines and may thus be applied by means of only slight alterations to milling machines at present in use as well as permitting the use of standard castings and parts for the column, knee, saddle, table, and most of the transmission to the knee, saddle and table, in manufacturing new machines.

While I have described and illustrated in detail a specific embodiment of my invention, it should be clearly understood that the description is only for purposes of illustration and that many modifications and variations will naturally occur to those skilled in the art.

I aim in the subjoined claims to cover all such legitimate variations and modifications.

I claim as my invention:

1. In a machine of the class described, a column, a table, a source of power for said column, a feed box portion in said column, a power transmission for said table comprising a drive gear and a driven gear projecting into said feed box portion, and means adapted to be interpolated to form a part of said power transmission in said column between said drive gear and said driven gear in said feed box portion to automatically control the motion of said table.

2. In a machine of the class described, a column, a table, a source of power for operating said table, a feed box portion in said column, power transmission for said table comprising a drive gear and a driven gear in said feed box portion, an automatically operating control device adapted to be interposed in said feed box portion and having connection between said drive gear and driven gear said device comprising change speed and reversing means adapted to be set manually and to operate automatically in the operation of the machine to control the operation of said table both as to speed and direction of movement.

3. In a device of the class described, a table, power transmission therefor, a plurality of control elements, a lost motion connection between said control elements and said transmission and means for continuing the motion of said control elements after stoppage of said table to the extent of the motion allowed by said lost motion connection.

4. In a device of the class described, a source of power, an element to be driven, a power transmission between said source and said element, control means interpolated in said power transmission, a control transmission from said power transmission to said control means, and means for continuing the actuation of said control means after the power transmission to said element has been disconnected.

5. In a device of the class described, a source of power, an element to be driven, a power transmission between said source and said element, control means for said power transmission, a control transmission from said power transmission to said control means and means for disconnecting said element from said power transmission and control transmission.

6. In a device of the class described, a source of power, an element to be driven, a power transmission from said source to said element, a movable control member, control elements carried by said member, a control transmission adapted to be actuated by said elements to control said power transmission, and a lost motion connection between said control member and an intermediate element of said power transmission.

7. In a device of the class described, a source of power, an element to be driven, a power transmission from said source to said element, a drum, control elements carried in said drum, a control transmission adapted to be actuated by said elements to control said power transmission, a lost motion connection between said drum and a portion of said power transmission, and means for disconnecting said driven element from said power transmission without disconnecting said drum.

8. In a device of the class described, a source of power, an element to be driven, a power transmission from said source to said element, a drum control elements carried by said drum, a control transmission adapted to be actuated by said elements to control said power transmission, a lost motion connection between said drum and a portion of said power transmission, and impositive driving means tending to actuate said drum from said source of power.

9. In a device of the class described, a column, a table, a source of power carried by said column, a power transmission from said source to said table, a control device carried by said column for automatically controlling said power transmission, a control transmission from an intermediate element of said power transmission to said control device, and a lost motion connection interpolated in said control transmission.

10. In a device of the class described, a column, a table, a source of power carried by said column, a power transmission from said source to said table, a control device carried by said column for automatically controlling said power transmission, a control transmission from an intermediate element of said power transmission to said control device, and a lost motion connection including a friction drive means between said power transmission and said element.

11. In a device of the class described, a column, a table, a source of power carried by said column, a power transmission from said source to said table, a control device carried by said column for automatically controlling said power transmission, and a lost motion connection including a friction drive extending from said control transmission to said control element, and tending to actuate it always in the same direction.

12. In a device of the class described, a source of power, an element to be driven, a power transmission from said source to said element, a control device adapted to control said power transmission, and two control transmissions from intermediate portions of said power transmission, one of said control transmissions including a friction drive and being directly connected to said control device, and the other of said control transmissions having a lost motion connection with said control device.

13. A device of the class described having, in combination, a source of power, an element to be driven, means for moving said element at various speeds and in different directions through a complete cycle, said means including a plurality of spaced elements adjustable to determine the cycle, and means for shifting the portion of the total travel of said element within which said cycle takes place without disturbing the adjustment of said elements.

14. In a device of the class described, a source of power, a plurality of clutches continuously actuated in various directions and at various speeds from said source of power, an element to be driven, a transmission adapted to deliver power to said element, means for selectively connecting said transmission to said clutches, an impositive drive actuated continuously from said source of power and tending to actuate said selective connecting means, and a positive drive connected to the transmission to said element and having a lost motion connection with said selective connecting means.

15. In a device of the class described, a source of power and a plurality of clutch elements continuously actuated in various directions and at various speeds from said source of power, an element to be driven, a transmission adapted to deliver power to said element, means for selectively connecting said transmission to said clutch elements, a positive drive including a lost-motion connection between said element and said connecting means, and an impositive drive between said source of power and said connecting means.

16. In a device of the class described, a source of power and a plurality of clutch elements continuously actuated in various directions and at various speeds from said source of power, an element to be driven, a transmission adapted to deliver power to said element, means for selectively connecting said transmission to said clutches, a positive drive including a lost-motion connection between said element and said connecting means, and an impositive drive between said source of power and said connecting means, said impositive drive tending to actuate said connecting means always in the same direction regardless of the direction of motion of said element.

17. In a device of the class described, a work table, a source of power, a transmission from said source to said table, a rotary control element operated from an element of said transmission adapted to automatically control the motion of said table, and a lost-motion connection between said transmission and said rotary control element.

18. In a device of the class described, a work table, a source of power, a transmission from said source to said table, a rotary control element adapted to automatically control the motion of said table, and a lost-motion connection between said power transmission and said rotary control element, said rotary control element carrying means for disconnecting said table at predetermined points from said source of power and for subsequently re-establishing a connection, and means for continuing the motion of said rotary element after said table has been disconnected from said source of power through the extent of motion allowed, by said lost motion connection, to re-establish a connection.

19. In a device of the class described, a work table, a source of power, a transmission from said source to said table, a rotary control element adapted to automatically control the motion of said table, and a lost-motion connection between said transmission and said rotary control element, said rotary control element carrying means for disconnecting said table at predetermined points from said source of power and for subsequently re-establishing a connection, and means for continuing the motion of said rotary element after said table has been disconnected from said source of power to re-establish a connection, said means for continuing the motion of said rotary control element being operative during motion of said table and control element in one direction and inoperative during motion in the other direction.

20. In a device of the class described, a work table, a source of power, a transmission from said source to said table, a rotary control element adapted to control said transmission, a lost-motion connection between said transmission and said rotary element, and a friction drive connection between said source and said rotary element.

21. In a device of the class described, a work table, a source of power, a transmission from said source to said table, a rotary control element adapted to control said transmission, a lost-motion connection between said transmission and said rotary element, and a friction drive connection between said source and said rotary element, said friction drive tending to actuate said element always in the same direction.

22. In a device of the class described, a work table, means for intermittently moving said work table in one direction through various portions of its stroke at various speeds, and means for reversing the direction of motion of said table at one end of its stroke and means for reversing the direction of said table in operation independently of the action of said last mentioned means.

23. In a device of the class described, a column, a knee supported by said column, a saddle supported by said knee, a table supported by said saddle, a source of power, a transmission from said source to said table, and an element remote from said knee, saddle and table, said element carrying means adapted to automatically control said transmission.

24. In a device of the class described, a column, a knee supported by said column, a saddle supported by said knee, a table supported by said saddle, a source of power, a transmission from said source to said table, and an element remote from said saddle and table, said element carrying means adapted to automatically control said transmission.

25. In a device of the class described, a source of power, a table, a plurality of clutch elements variously driven from said source of power, a plurality of connecting elements each adapted to connect one of said clutch elements to said table, a rotary member having a plurality of peripheral grooves one for each connecting element, adjustable means mounted in said grooves, a plurality of transmissions from said adjustable means to said connecting elements, and automatic means for preventing simultaneous actuation of more than one of said transmissions to move its connecting element into operative position.

26. In a device of the class described, a source of power, a table, a plurality of clutch elements variously driven from said source of power, a plurality of connecting elements each adapted to connect one of said clutch elements to said table, a rotary member having a plurality of peripheral grooves one for each connecting element, adjustable means mounted in said grooves, a plurality of transmissions, each including locking mechanism, from said grooves to said connecting elements, and automatic means for preventing simultaneous actuation of more than one of said transmissions to move its connecting element into operative position.

27. In a device of the class described, a source of power, a table, a plurality of clutches normally resiliently held out of engagement and adapted to actuate said table from said source of power at various speeds and in various directions, and manual means for selectively forcing said clutches into engagement, said manual means including a transmission having a locking action.

28. In a device of the class described, a source of power, a table, means for connecting said source of power to actuate said table at various speeds and in various directions, an automatic control element, a plurality of transmissions each having a locking action and actuated by said control element to engage said various connecting means, and additional manual selective control means connected to intermediate elements of said transmissions.

29. In a device of the class described, a source of power, a table, means for connecting said source of power to actuate said table at various speeds and in various directions, an automatic control element, a plurality of transmissions each having a locking action and actuated by said control element to engage said various connecting means, and additional manual selective control means connected to intermediate elements of said transmissions, said locking mechanisms being located between said manual control mechanism and said connecting means.

30. In a machine of the class described, the combination of a table to hold work to be machined, a column alongside said table comprising an overarm portion to support a driven tool spindle over the work, a source of power, a transmission from said source to said spindle and table, and an element carrying means adapted automatically to control said transmission, said element being disposed remote from the work to avoid encountering machinings produced therefrom by the tool on said spindle.

31. In a machine of the class described, the combination of a table to support work to be machined, a driven tool spindle over said table, said table being adapted for reciprocation with respect to said spindle, a source of power, a transmission from said source to said table including a plurality of clutches, a control device impositively driven from the live side of said transmission to operate said clutches, said device being capable of engaging and disengaging clutches on the forward stroke and at one end of the stroke only to engage a clutch to cause a reversal of the movement of said table.

32. In a machine of the class described the combination of a table to support work to be machined, a driven tool spindle over said table, said table being adapted to reciprocate with respect to said spindle and to move on its forward stroke at variable speeds and on its return stroke to move quickly at a uniform speed, a power transmission to said table, said transmission including clutch elements, a control device adapted to operate said clutches depending upon the position and direction of movement of said table, said control device being actuated to operate the reversing clutch during the forward stroke of the table, whereby the table motion is arrested and reversed, and manually operable means to operate said clutches to start said table again at the end of each cycle of movements.

33. In a machine of the class described, the combination of an element to be driven, a source of power, a power transmission between said source and said element, said transmission comprising clutch members, a control device operated from said power transmission comprising clutch dogs, clutch levers operated thereby, movable elements associated with said clutch levers, a manual control device connected therewith adapted to move said elements to operate said clutch levers independently of said clutch dogs.

34. In a machine of the character described a reciprocatory element to be driven, power transmission for said element, control means for said transmission to produce variable speeds of motion of said element and in different directions, said transmission including clutch members adapted each to be engaged for a certain speed or motion of said element and to be disengaged before the engagement of another clutch corresponding to another speed or motion, and means operable upon the engagement of one of said clutches to prevent the engagement of another pending its own disengagement.

35. In a device of the class described, a plurality of power driven clutch elements, a plurality of clutch elements connected to a transmission, an oscillating drum and means associated with said drum for automatically and selectively actuating said clutches into operative engagement in a predetermined sequence during oscillation of said drum.

36. In a device of the class described, a column, a table, a source of power carried by said column, a power transmission from said source to said table, a control device carried by said column for automatically controlling said power transmission, a control transmission from an intermediate element of said power transmission to said control device, and manual means for interrupting said power transmission between said table and said intermediate element.

37. In a device of the class described, a source of power, a table, a plurality of clutch elements variously driven from said source of power, a plurality of connecting elements adapted to connect various clutch elements to said table, and a selective manual control adapted to actuate said connecting elements into connection with said clutch elements.

38. In a device of the class described, a reciprocating table, a source of power, a power transmission between said table and said source, an oscillating rotary control device, a lost motion connection between said power transmission and said device whereby the motion of the control device may be varied from the motion of the table by the amount of the lost motion.

39. A device of the class described having a driving shaft, a power transmission, a control device within said transmission, a driven shaft, said transmission having a series of selectively operated clutches controlled by said control device whereby continuously rotary motion of the driving shaft is converted to oscillating rotary motion of the driven shaft at a variety of speeds.

40. An attachment for a machine of the sort described, said machine having a driving element and a driven element, said attachment comprising a power transmission adapted to connect said driving and driven elements, an automatic control device operated by said transmission, said transmission having a plurality of selectively operated clutch elements operated by the control device whereby continuously rotary motion received from said driving element is converted to oscillatory rotary motion at a variety of speeds and delivered to said driven element.

In testimony whereof, I have hereunto set my hand.

GUSTAF DAVID SUNDSTRAND.